UNITED STATES PATENT OFFICE.

FREEMAN SCOTT MOON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR OBTAINING POTASSIUM CHLORIDE.

1,402,173. Specification of Letters Patent. Patented Jan. 3, 1922.

No Drawing. Application filed October 22, 1919. Serial No. 332,524.

*To all whom it may concern:*

Be it known that I, FREEMAN SCOTT MOON, a citizen of the United States, residing at Los Angeles, in the county of Los Angeles, in the county of Los Angeles and State of California, have invented a new and useful Process for Obtaining Potassium Chloride, of which the following is a specification.

This invention relates to a process for producing potassium chloride and is particularly applicable to the production of potassium chloride from cement kiln dust, or other flue dust from furnaces, such as glass furnaces, or the like.

In cases of this kind, the potassium compound often occurs in the form of a mixture of potassium salts, for example, potassium sulphate and potassium chloride. This process has been developed with special reference to the treatment of dust collected by electrical precipitation, or otherwise, from cement kilns using a raw mix containing a small percentage of potassium and also containing a small percentage of sodium chloride with the result that the potassium compound existing in the flue dust is partly in the form of chloride and partly in the form of sulphate. The material obtained by leaching such dust and evaporating the resulting solution, being a mixture of potassium salts and other salts, is of comparatively low value and the main object of my invention is to provide for so carrying out the leaching operation that the potassium present will be substantially recovered in the form of approximately pure potassium chloride having a relatively high value.

The process is also applicable when the alkali content of the dust is mainly sulphate, or is in the form of carbonates, with or without sulphates and with or without chlorides.

I will describe the process as applied to a cement kiln dust obtained by electrical precipitation of the dust contained in the flue gases passing from a coal fired cement kiln wherein a small percentage of sodium chloride is used in connection with the raw mix as a volatilizing agent for potassium compound present in the raw mix, such flue dust containing chlorides and sulphates in approximately equal amounts.

The process may be carried out as follows:

Four (4) tons of dust and two hundred and forty (240) pounds of crude calcium chloride is mixed with about twice that quantity of water and maintained at a suitable temperature for a sufficient time for completion of the reaction. To expedite the reaction the mixture may be digested with steam say for about an hour. The mixture is then passed through a filter and the filtrate taken to the evaporators. Here it is concentrated to about 28° Be. and then drawn off by decantation to crystallizing tanks, while the calcium salts and a portion of the sodium salts together with some potassium salts remain in the evaporator or are removed during the evaporation.

The concentrated solution is allowed to cool in the crystallizers, preferably with artificial cooling to cause crystallization of potassium chloride, and is drawn off to a sump or storage tank from which it is returned to the evaporators.

The salt crystallized out in the crystallizing tanks is allowed to drain and then packed into barrels for shipment.

In order to assist in the settling of the calcium sulphate that may form in the sump, it is preferable to provide for heating the solution in the sump, for example, with steam. This sulphate can then be removed from time to time and added directly to the digestor mixture so as to take out any admixed potassium salt and the residual calcium sulphate may be caught.

In the leaching solution from potash bearing treater dust with calicum chloride the resultant salts present in solution are mainly sodium and potassium chloride.

The separation of the above salts is ordinarily as follows: the filtered leaching solution and the cold liquor from the crystallizers is delivered to a single effect evaporator. The solution is evaporated to a point where nearly saturation of the potassium chloride is obtained. The sodium chloride separates out of the boiling solution. When the proper concentration is reached the solution is delivered to the crystallizers where potassium chloride is deposited from the cooling solution. The cold liquor is then returned to the evaporator and evaporated with the weak leaching solution.

The treater dust leached and treated with calcium chloride usually contains a larger amount of potassium chloride than of sodium chloride, therefore upon evaporating the leaching solution saturation of the potassium chloride salt is first obtained.

To produce the purest potassium chloride the evaporation of the solution should be done in two stages. The first stage delivering into the second should evaporate the returned mother liquor from the crystallizers. All of the sodium chloride is drawn from the first stage. When the solution has reached the proper concentration, i. e., when the solution has reached near saturation with potassium chloride solution, it is then delivered to the second stage. In the second stage the weak leaching solution is mixed with the saturated solution from the first stage and evaporated to saturation of the potassium chloride salt, when it is then delivered to the crystallizers.

The above method could only be used when upon evaporating the leaching solution potassium chloride reaches saturation before the sodium chloride.

If the sodium chloride be present only in small amounts and if lime and sulphate are not objectionable it may be found practical to separate out some of the potassium chloride from the hot liquor in a single effect until the saturation of sodium chloride is obtained. This would reduce evaporation costs, also the size of the crystallizing tanks necessary.

The sodium chloride settling out in the evaporators may be removed either continually or intermittently; this will be practically only a mixture of calcium sulphate and sodium chloride and may, therefore, be returned to the kilns. Any potassium salt it may contain can be washed out in a filter by using a concentrated solution of sodium chloride as wash water.

An important advantage of converting the potassium present in or obtained from the cement dust to the form of chloride is that this permits the solution to be extracted at greater concentration than would be possible with the sulphate on account of the greater solubility of the chloride. By reason of the greater concentration obtainable with chloride less evaporation is required for the recovery of the solid salt from the solution and considerable saving of fuel is effected. Moreover, the chloride of potassium is free from the disadvantageous tendency of the sulphate to separate out together with calcium sulphate at certain stages of the process, forming scales on the surface of the leaching receptacles. These advantages are of especial importance when the leaching is carried out by passing the leaching solution over extended surfaces in contact with hot kiln gases containing the dust to be treated, such dust being taken up by the solution.

My invention may be carried out by leaching the cement kiln dust collected in any suitable manner, or it may be carried out by utilizing the leaching solution for collection of the dust to be treated from hot gases from cement kilns, such gases being passed in contact with streams of the liquid flowing over surfaces or walls, and a convenient application of the invention is in connection with an electrical precipitator of the wet type, such as is disclosed in Patent No. 1,250,088 to H. A. Burns, dated December 11th, 1917, or other type in which the collecting electrodes of the precipitator are provided with means for maintaining flow of liquid thereover. In such cases, the liquid used for circulation over the collecting surfaces is preferably residual liquor remaining after the potassium chloride has been removed from the solution resulting from leaching and evaporation.

While my invention is especially advantageous in its application to a cement kiln flue dust containing a mixture of sulphates and chlorides, it has certain advantages in cases where the dust to be leached is free from chlorides. The flue dust which is collected from waste gases from the rotary kiln calcining or clinkering Portland cement raw mix without the use of a chloride in the kiln and which is leached according to the present process for recovering potassium salt contains alkali-metal sulphates, calcium sulphate and calcium oxide and the amount of calcium chloride added is sufficient to combine or react with substantially all the sodium and potassium present to form sodium chloride and potassium chloride. In the leaching of cement kiln flue dust of this character it has been found that there is a tendency for the sulphates of sodium and potassium to form the double salt $CaSO_4.K_2SO_4.H_2O$ and by agitating this double salt in water in the presence of calcium chloride, according to the above described process, the double salt referred to is broken up and the potassium obtained in the form of potassium chloride, according to the following reaction:

$$CaSO_4.K_2SO_4.H_2O + CaCl_2 = 2CaSO_4 + 2KCl + H_2O$$

My process may be applied to non-chloride dust in the same manner as above described for the dust containing mixed chlorides and sulphates, and, on the other hand, in applying my invention to the leaching of cement kiln flue dust containing mixed chlorides and sulphates, the breaking up of the salt $CaSO_4.K_2SO_4.H_2O$ takes place to the extent to which these sulphates are present in the dust, and is, therefore, generally a result of my process in operating either with chloride-free dust or with dust containing both chlorides and sulphates.

In applying my invention to the leaching of blast furnace dust the process may be carried out in similar manner but the dust in such cases contains a large proportion of carbonates of alkali and alkaline earth metals, and the effect of the addition of the calcium chloride in such cases is to convert the alkali carbonates to alkali chlorides, so that approximately pure potassium chloride may be produced.

What I claim is:

1. The process of producing potassium chloride from the flue dust collected from waste gases from a rotary kiln calcining or clinkering Portland cement raw mix and containing alkali metal sulphates, calcium sulphates and calcium oxide, which consists in agitating such dust in water in sufficient quantity to hold in solution the sodium and potassium salts, adding material containing calcium chloride thereto in amount sufficient to combine with substantially all of the sodium and potassium present as sulphates to form sodium chloride and potassium chloride, separating the liquids from the solids and then separating the potassium chloride by fractional crystallization.

2. The process of producing potassium chloride from the flue dust collected from waste gases from a rotary kiln calcining or clinkering Portland cement raw mix and containing alkali metal sulphates, calcium sulphates and calcium oxide, which consists in agitating such dust in water in sufficient quantity to hold in solution the sodium and potassium salts, adding material containing calcium chloride thereto in amount sufficient to combine with substantially all of the sodium and potassium present to form sodium chloride and potassium chloride, separating the liquids from the solids and then separating the potassium chloride by fractional crystallization.

3. The process of recovering potassium chloride, which consists in decomposing the double salt $CaSO_4.K_2SO_4.H_2O$ by agitating said double salt in water in the presence of $CaCl_2$ causing substantially the reaction $CaSO_4.K_2SO_4.H_2O + CaCl_2 =$
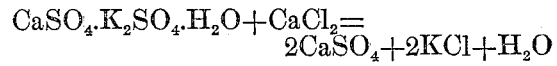
$2CaSO_4 + 2KCl + H_2O$ and separating the potassium chloride by crystallization.

4. The step in the process of obtaining potassium chloride, which consists in bringing calcium sulphate and potassium sulphate together in the presence of water and of calcium chloride to convert the potassium from its sulphate form into its chloride.

5. The step in the process of separating potassium salt from sodium salt, which consists in agitating an aqueous solution containing the sulphates of such metals and containing sufficient calcium chloride to furnish an amount of chlorine sufficient to convert all of the alkali metal sulphates into their corresponding chlorides.

6. The step of separating potassium chloride from sodium chloride in weak mixed solutions, which consists in treating the weak solution to produce a hot solution saturated with respect to potassium chloride then cooling to crystallize out potassium chloride, then evaporating the mother liquor separately from the aforesaid evaporation to separate out sodium chloride, and bring the solution to saturation with respect to potassium chloride, and then mixing the solution with fresh weak solution and evaporating to produce a hot solution saturated with potassium chloride for repetition of the operation in cyclic manner.

In testimony whereof I have hereunto subscribed my name this 17th day of October 1919.

FREEMAN SCOTT MOON.

Certificate of Correction.

It is hereby certified that in Letters Patent No. 1,402,173, granted January 3, 1922, upon the application of Freeman Scott Moon, of Los Angeles, California, for an improvement in "Processes for Obtaining Potassium Chloride," an error appears in the printed specification requiring correction as follows: Page 1, line 15, for the word "glass" read *blast;* and that the said Letters Patent should be read with this correction therein that the same may conform to the record of the case in the Patent Office.

Signed and sealed this 4th day of April, A. D., 1922.

[SEAL.]

KARL FENNING,
*Acting Commissioner of Patents.*